United States Patent
Tamura et al.

(10) Patent No.: US 7,878,088 B2
(45) Date of Patent: Feb. 1, 2011

(54) SEALING DEVICE FOR JOINT SECTION OF ROBOT AND ARTICULATED ROBOT HAVING THE SAME

(75) Inventors: Toshinari Tamura, Gotenba (JP); Hidenori Kurebayashi, Yamanashi (JP); Atsushi Aizawa, Fuefuki (JP); Yasuyoshi Tanaka, Yamanashi (JP); Katsumi Fujimoto, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 620 days.

(21) Appl. No.: 11/896,008

(22) Filed: Aug. 29, 2007

(65) Prior Publication Data

US 2008/0258402 A1  Oct. 23, 2008

(30) Foreign Application Priority Data

Aug. 31, 2006  (JP) .............................. 2006-236080

(51) Int. Cl.
*B25J 17/00* (2006.01)
*F16J 15/34* (2006.01)

(52) U.S. Cl. .............. 74/490.01; 74/490.06; 74/490.05; 277/353; 277/551

(58) Field of Classification Search ................ 277/353, 277/551, 562, 572; 74/490.01, 490.06, 490.05
See application file for complete search history.

(56) References Cited

U.S. PATENT DOCUMENTS

| | | | | | |
|---|---|---|---|---|---|
| 3,838,862 | A | * | 10/1974 | Fern | 277/400 |
| 3,973,779 | A | * | 8/1976 | Burgmann et al. | 277/425 |
| 4,413,830 | A | * | 11/1983 | Pietsch | 277/364 |
| 4,832,511 | A | * | 5/1989 | Nisley et al. | 384/480 |
| 4,861,172 | A | * | 8/1989 | Rudolf et al. | 384/477 |
| 5,293,107 | A | * | 3/1994 | Akeel | 318/568.11 |
| 6,484,067 | B1 | | 11/2002 | Kinoshita et al. | |
| 2002/0035413 | A1 | | 3/2002 | Kinoshita et al. | |
| 2005/0111940 | A1 | | 5/2005 | Markert et al. | |
| 2005/0188720 | A1 | * | 9/2005 | Jansen | 62/500 |

FOREIGN PATENT DOCUMENTS

EP  1 201 975 A2  5/2002

(Continued)

OTHER PUBLICATIONS

Japanese Notice of Reasons for Rejection mailed Nov. 25, 2008 issued in Japanese Application No. 2006-236080 (including a partial translation thereof).

*Primary Examiner*—Vishal Patel
(74) *Attorney, Agent, or Firm*—Drinker Biddle & Reath LLP

(57) ABSTRACT

A sealing device provided to a joint section of a robot. The sealing device includes overlapped seal portions having a multi-stage configuration, provided for a driving mechanism incorporated into the joint section. The overlapped seal portions include a first seal portion including a first contact seal element sealing a first inter-member gap defined adjacent to a lubricant retaining section provided in the driving mechanism; and a second seal portion arranged outside the first seal portion and including a second contact seal element sealing a second inter-member gap defined in a circumferential wall of the joint section, the circumferential wall defining an accommodation space for accommodating the driving mechanism.

3 Claims, 5 Drawing Sheets

FOREIGN PATENT DOCUMENTS

| | | |
|---|---|---|
| EP | 1 525 956 A1 | 4/2005 |
| JP | 63-22290 | 1/1988 |
| JP | 9-155774 | 6/1997 |
| JP | 11-33949 | 2/1999 |
| JP | 11-33974 | 2/1999 |
| JP | 11-291130 | 10/1999 |
| JP | 2001-254787 | 9/2001 |
| WO | 88/00515 A | 8/1988 |

* cited by examiner

SEALING DEVICE FOR JOINT SECTION OF ROBOT AND ARTICULATED ROBOT HAVING THE SAME

BACKGROUND OF THE INVENTION

1. Field of the Invention

The present invention relates to a sealing device provided to a joint section of a robot. The present invention also relates to an articulated robot in which a joint section is equipped with a sealing device.

2. Description of the Related Art

Typically, in an articulated robot in which a driving mechanism for driving an arm or a wrist is incorporated into a joint section, in order to prevent a lubricant retained in the driving mechanism from leaking out, to the exterior of the joint section, an oil seal, as one type of a contact seal element, is provided in a relatively movable region of an output-end member of the driving mechanism (e.g., a bearing unit at the output side of a reduction gear unit). In particular, in certain applications where it is required to effectively prevent the environment of the robot or an objective workpiece to be operated by the robot from being contaminated due to the operation of the robot, it has been proposed that the joint section be equipped with a sealing device capable of providing overlapped seal portions having a multi-stage configuration, for the driving mechanism incorporated into the joint section.

For example, Japanese Unexamined Patent Publication (Kokai) No. 63-22290 (JP-A-63-22290) discloses a wrist mechanism of a robot adapted to operate in a clean room, which is equipped with a two-stage type sealing device including a grease seal (i.e., a contact seal element) for sealing an output-end member of a reduction gear unit of a driving mechanism incorporated into a wrist housing, and a labyrinth seal (i.e., a non-contact seal element) for sealing a gap between the wrist housing and a movable wrist portion joined to the driving mechanism. In this wrist mechanism, the interior space of the wrist housing is maintained at a negative pressure, so that it is possible to effectively prevent a lubricant retained in the driving mechanism and dust particles generated due to the abrasion of movable members in the driving mechanism from leaking out, to the exterior of the wrist housing or into a clean room.

The sealing device for the wrist mechanism or the joint section of the robot, described in JP-A-63-22290, is configured such that the outer seal portion of the two-stage overlapped seal portions or sealing device is constituted by a labyrinth seal (or non-contact seal element), and thus can effectively seal against dust particles that may be pulled in by the negative pressure into the housing. However, if the lubricant in the driving mechanism passes through the grease seal, forming the inner seal portion of the overlapped seal portions, the above conventional sealing device may not sufficiently seal in the lubricant. Further, since it is assumed that, in JP-A-63-22290, the robot is used in a clean room, in the case where foreign matter, such as dust particles, liquid droplets, etc., exist in the external environment of the robot, it may be difficult to prevent the foreign matter from penetrating through the labyrinth seal into the wrist housing.

For example, in manufacturing lines of products required to be free from contamination, such as food, medicine, etc., an articulated robot provided for handling such products has to reliably prevent not only the lubricant from leaking out of the joint section, but also must prevent washing agents or sterilizing gas blown onto the robot from penetrating into the interior of the joint section. Therefore, in the case of the articulated robot for handling products required to be free from contamination, even if the joint section is equipped with the sealing device described in JP-A-63-22290, it may be difficult to ensure sealing at a required level.

SUMMARY OF THE INVENTION

It is an object of the present invention to provide a high-performance sealing device provided to a joint section of a robot, which can reliably prevent a lubricant or dust particles, retained or generated in a driving mechanism incorporated into the joint section, from leaking out, to the exterior of the joint section, and also prevent foreign matter in the external environment of the robot from penetrating into the interior of the joint section.

It is another object of the present invention to provide an articulated robot provided with a high-performance sealing device in a joint section, wherein the sealing device can reliably prevent a lubricant or dust particles, retained or generated in a driving mechanism incorporated into the joint section, from leaking out, to the exterior of the joint section, and also prevent foreign matter in the external environment of the robot from penetrating into the interior of the joint section, so that the articulated robot can be preferably used on manufacturing lines in which products are required to be free from contamination.

To accomplish the above object, the present invention provides a sealing device provided to a joint section of a robot: comprising overlapped seal portions having a multi-stage configuration, provided for a driving mechanism incorporated into the joint section; the overlapped seal portions comprising a first seal portion including a first contact seal element sealing a first inter-member gap adjacent to a lubricant retaining section provided in the driving mechanism; and a second seal portion arranged outside the first seal portion and including a second contact seal element sealing a second inter-member gap in a circumferential wall of the joint section, the circumferential wall defining an accommodation space for accommodating the driving mechanism.

In the above sealing device, the first inter-member gap may be defined adjacent to a bearing unit supporting a pair of sections, movable relative to each other, of the robot in a mutually rotatable manner, the sections being joined through the joint section; and the first contact seal element of the first seal portion may be disposed in the first inter-member gap.

In this arrangement, the driving mechanism may include a reduction gear unit; and the bearing unit and first contact seal element may be disposed between a pair of members, movable relative to each other, of the reduction gear unit.

The circumferential wall of the joint section may include a pair of wall members joined respectively to a stationary element and a movable element of the bearing unit; and the second contact seal element of the second seal portion may be disposed between the pair of wall members.

In the above sealing device, the second inter-member gap may be formed in a region allowing the accommodation space to directly communicate with the external environment of the robot; and the second contact seal element of the second seal portion may be disposed in the second inter-member gap.

The present invention also provides an articulated robot which can handle a product required to be free from contamination, comprising a joint section; and a sealing device, as set forth above, provided for the joint section.

BRIEF DESCRIPTION OF THE DRAWINGS

The above and other objects, features and advantages of the present invention will become more apparent from the following description of preferred embodiments in connection with the accompanying drawings, wherein.

DETAILED DESCRIPTION

Figure 1:
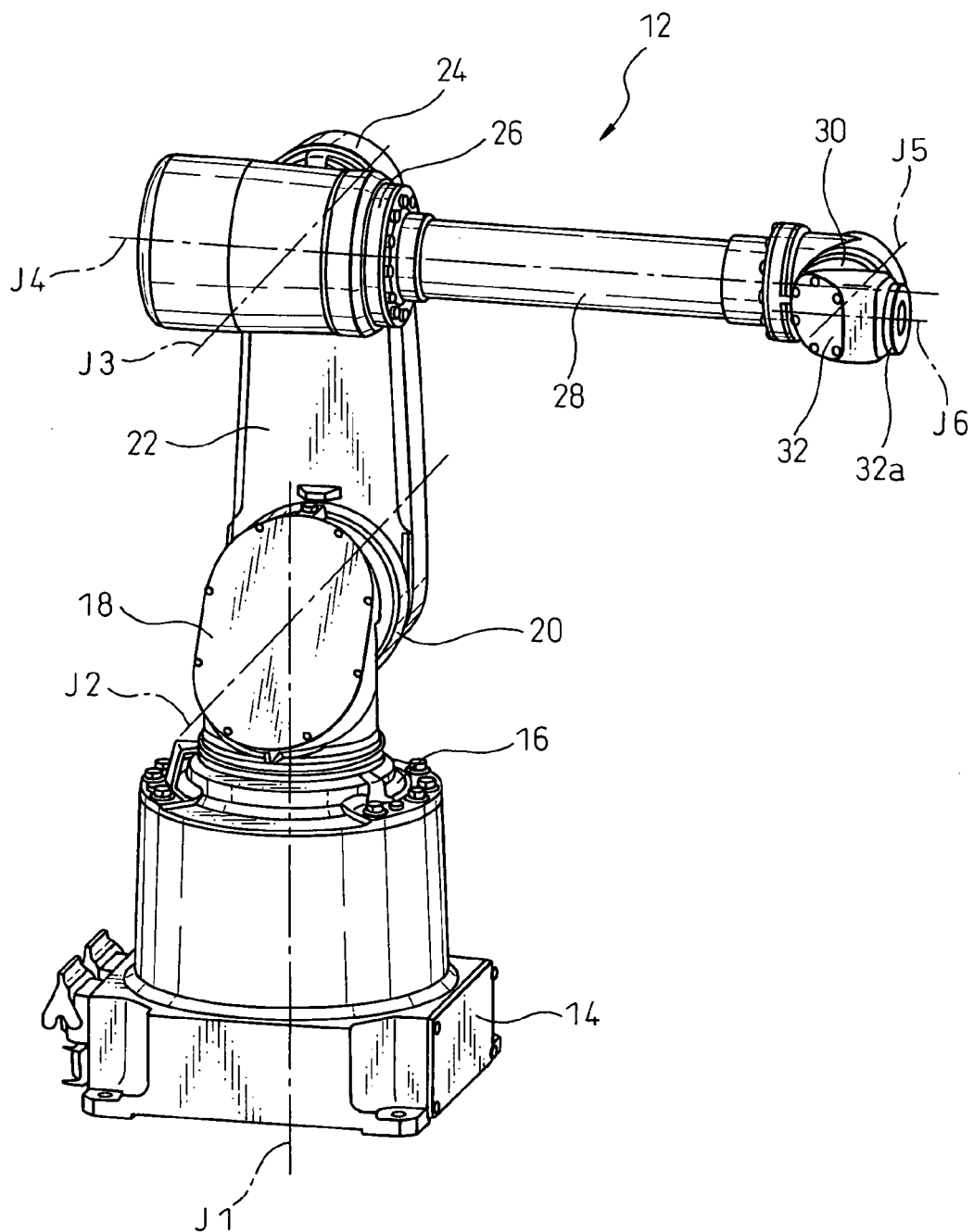
FIG. 1 is a perspective view of a robot according to an embodiment of the present invention.

The embodiments of the present invention are described below in detail, with reference to the accompanying drawings. In the drawings, same or similar components are denoted by common reference numerals.

Figure 2:
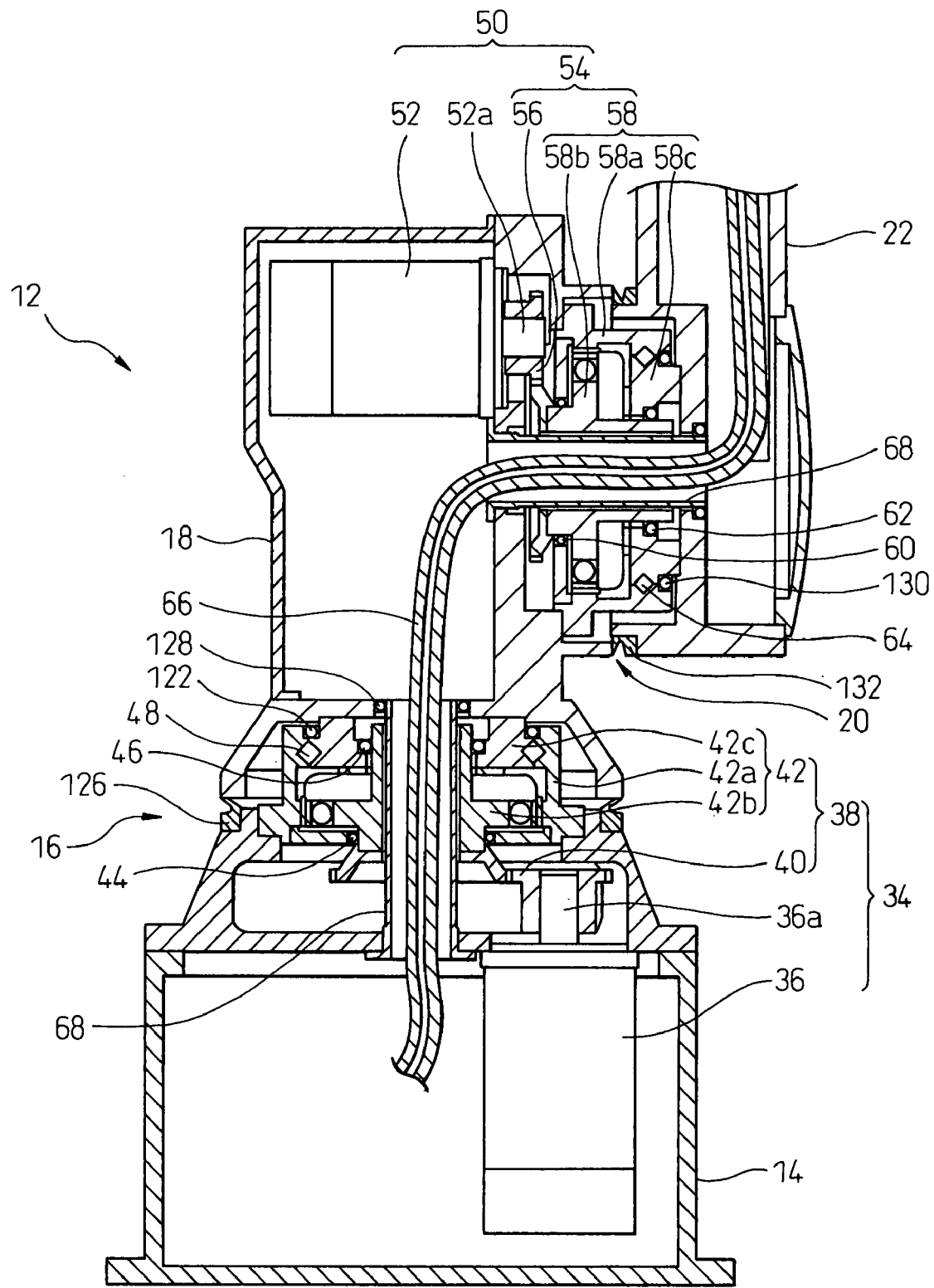
FIG. 2 is a vertical sectional view showing internal structures of first and second joint sections of the robot of FIG. 1.
Figure 3:
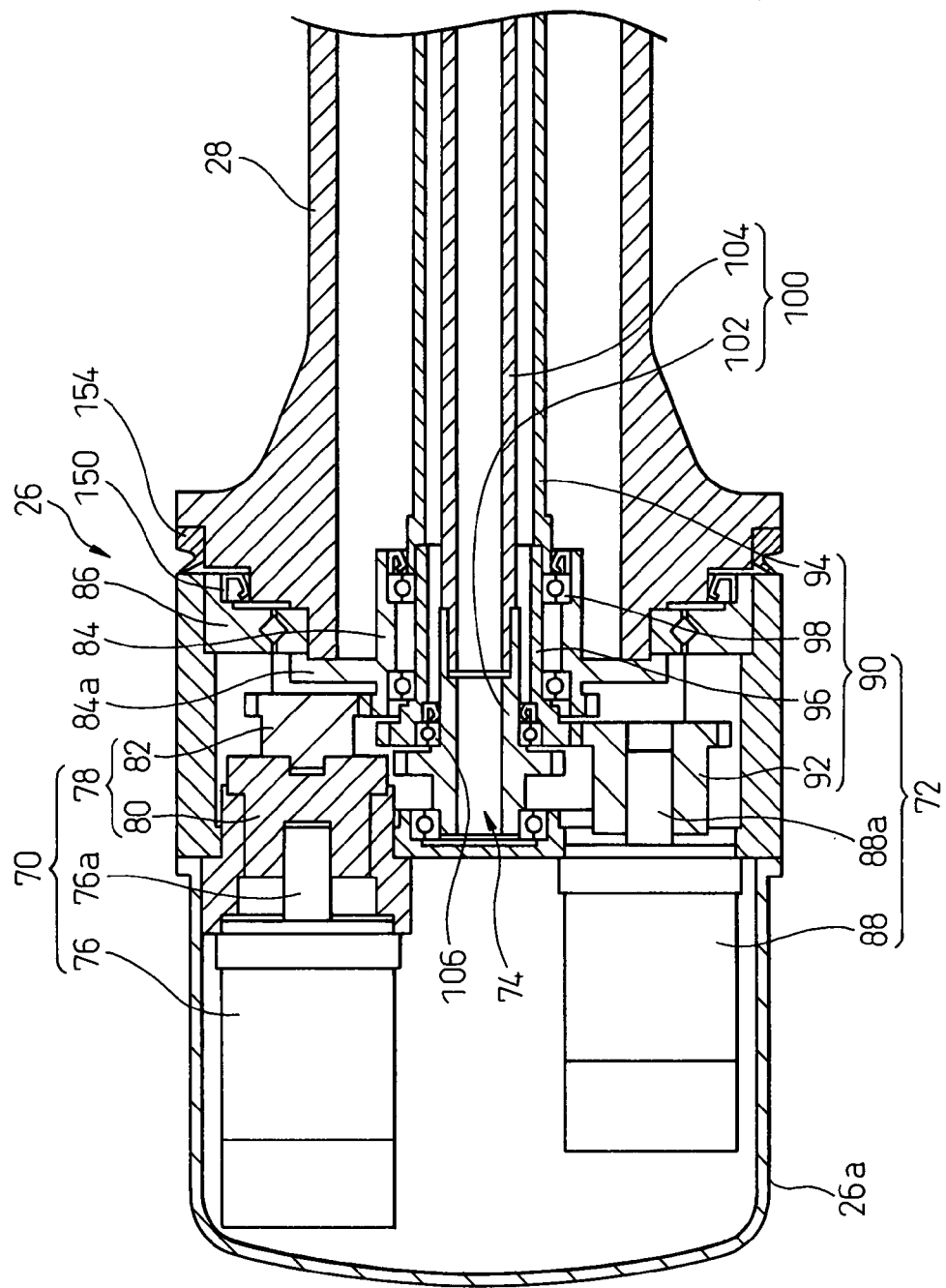
FIG. 3 is a vertical sectional view showing an internal structure of a fourth joint section of the robot of FIG. 1.
Figure 4:
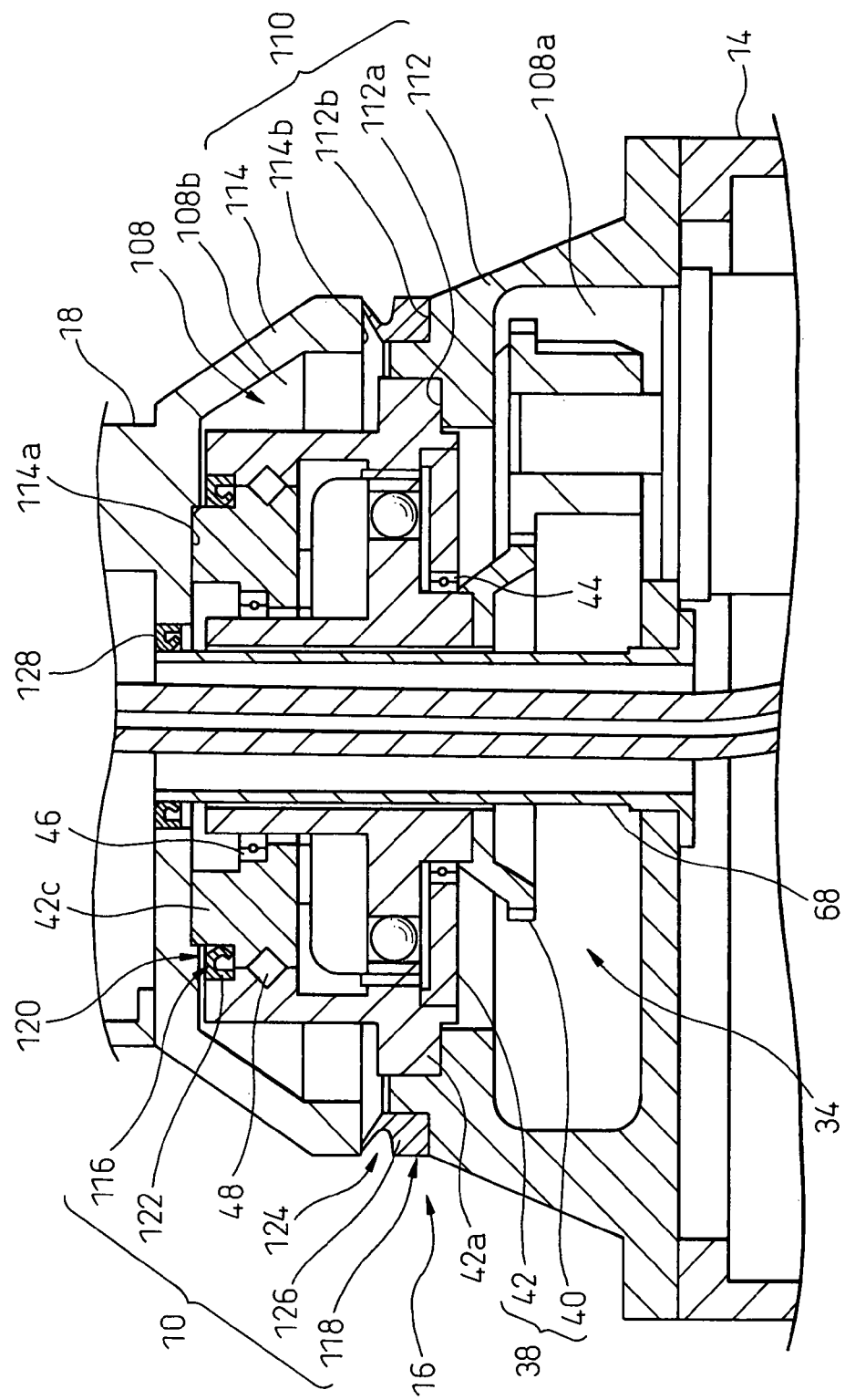
FIG. 4 is an enlarged view of the first joint section of FIG. 2, which shows a configuration of a sealing device according to an embodiment of the present invention.
Figure 5:
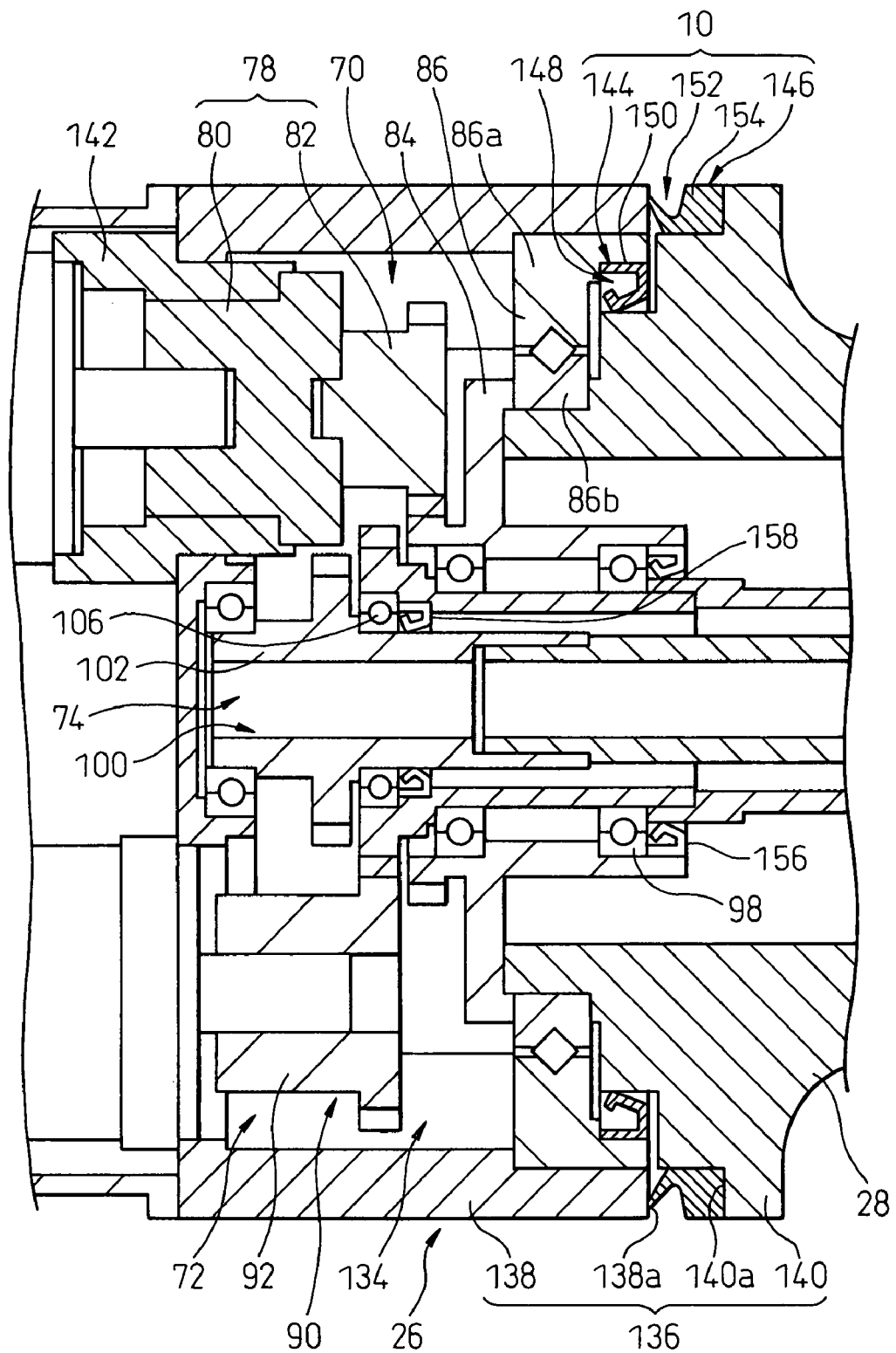
FIG. 5 is an enlarged view of the fourth joint section of FIG. 3, which shows a configuration of a sealing device according to another embodiment of the present invention.

Referring to the drawings, FIG. 1 shows an articulated robot 12 (hereinafter simply referred to as a robot 12) according to an embodiment of the present invention and provided, in each joint section thereof, with a sealing device 10 according to an embodiment of the present invention; FIGS. 2 and 3 show the internal structures of joint sections of the robot 12; and FIGS. 4 and 5 show an enlarged view of the configurations of the sealing devices 10 provided to the joint sections of the robot 12. The robot 12 is shown to have a mechanical configuration of a 6-axis vertical articulated robot provided mainly with joint sections having a direct drive structure. However, the robot according to the present invention is not limited to this mechanical configuration.

As shown in FIG. 1, the robot 12 includes a stationary base 14; a rotary post 18 joined to the stationary base 14 through a first joint section 16; a first arm section 22 joined to the rotary post 18 through a second joint section 20; a second arm section 28 joined to the first arm section 22 through a third joint section 24 and a fourth joint section 26; and a wrist section 32 joined to the second arm section 28 through a wrist joint section 30. The first joint section 16 joins the rotary post 18 to the stationary base 14 rotatably about a first vertical control axis J1. The second joint section 20 joins the first arm section 22 to the rotary post 18 rotatably (or swingably) about a second horizontal control axis J2 orthogonal to the first control axis J1. The third joint section 24 joins the second arm section 28 to the first arm section 22 rotatably (or swingably) about a third horizontal control axis J3 parallel to the second control axis J2. The fourth joint section 26 joins the second arm section 28 to the first arm section 22 rotatably about a fourth control axis J4 orthogonal to the third control axis J3.

The wrist joint section 30 joins the wrist section 32 to the second arm section 28 rotatably (or swingably) about a fifth control axis J5 that is orthogonal to the fourth control axis J4, and supports an end member 32a of the wrist section 32 rotatably about a sixth control axis J6 orthogonal to the fifth control axis J5. An end effector (not shown) is attached to the end member 32a of the wrist section 32. Under various controls of the first control axis J1 to the sixth control axis J6, the robot 12 can variously operate the first and second arm sections 22, 28 and the wrist section 32, thereby performing various tasks by using the end effector.

As shown in FIG. 2, the first joint section 16 is provided with a first driving mechanism 34 incorporated therein for rotationally driving the rotary post 18 about the first control axis J1 (FIG. 1). The first driving mechanism 34 includes a drive motor 36 accommodated in the stationary base 14; and a power transmission mechanism 38 for transmitting the output power of the drive motor 36 to the rotary post 18. The power transmission mechanism 38 includes a gear train 40 connected to an output shaft 36a of the drive motor 36; and a reduction gear unit 42 connected to the gear train 40. The reduction gear unit 42 includes a fixed member 42a fixedly joined to the stationary base 14; an input member 42b joined to the gear train 40 so as to rotate with respect to the fixed member 42a; and an output member (or an output-side movable member) 42c fixedly joined to the rotary post 18 and engaged with the fixed member 42a so as to rotate with respect to the input member 42b at a predetermined speed-reduction ratio. Bearing units 44, 46 and 48 are disposed, in the reduction gear unit 42, between the fixed member 42a and the input member 42b, between the input member 42b and the output member 42c, and between the fixed member 42a and the output member 42c, respectively.

Similarly, the second joint section 20 is provided with a second driving mechanism 50 incorporated therein for rotationally driving the first arm section 22 about the second control axis J2 (FIG. 1). The second driving mechanism 50 includes a drive motor 52 accommodated in the rotary post 18; and a power transmission mechanism 54 for transmitting the output power of the drive motor 52 to the first arm section 22. The power transmission mechanism 54 includes a gear train 56 connected to an output shaft 52a of the drive motor 52, and a reduction gear unit 58 connected to the gear train 56. The reduction gear unit 58 includes a fixed member 58a fixedly joined to the rotary post 18; an input member 58b joined to the gear train 56 so as to rotate with respect to the fixed member 58a; and an output member (or an output-side movable member) 58c fixedly joined to the first arm section 22 and engaged with the fixed member 58a so as to rotate with respect to the input member 58b at a predetermined speed-reduction ratio. Bearing units 60, 62 and 64 are disposed, in the reduction gear unit 58, between the fixed member 58a and the input member 58b, between the input member 58b and the output member 58c, and between the fixed member 58a and the output member 58c, respectively.

Although not shown, the third joint section 24 is provided with a third driving mechanism incorporated therein for rotationally driving the second arm section 28 about the third control axis J3 (FIG. 1). The third driving mechanism has a configuration similar to that of each of the first and second driving mechanisms 34, 50 described above. The robot 12 also has a configuration in which an umbilical member 66 for supplying electric power, materials, etc., to the end effector attached to the wrist section 32 is laid inside the stationary base 14, the rotary post 18, the first arm section 22 and the second arm section 28. Accordingly, the first to third joint sections 16, 20, 24 are provided with a pipe 68 through which the umbilical member 66 passes.

On the other hand, as shown in FIG. 3, the fourth joint section 26 is provided with a fourth driving mechanism 70 incorporated therein for rotationally driving the second arm section 28 about the fourth control axis J4 (FIG. 1); a major part of a fifth driving mechanism 72 incorporated therein for rotationally driving the wrist section 32 (FIG. 1) about the fifth control axis J5 (FIG. 1); and a major part of a sixth driving mechanism 74 incorporated therein for rotationally driving the end member 32a (FIG. 1) of the wrist section 32 about the sixth control axis J6 (FIG. 1). The fourth driving mechanism 70 includes a drive motor 76 disposed alongside the fourth joint section 26; and a power transmission mechanism 78 for transmitting the output power of the drive motor 76 to the second arm section 28 (a case 26a for housing the drive motor is shown). The power transmission mechanism 78 includes a reduction gear unit 80 connected to an output shaft 76a of the drive motor 76; and a gear train 82 connected to an output part of the reduction gear unit 80. A final gear 84 of the gear train 82 has a hollow tubular body having a flange 84a protruding radially outward, and an outer peripheral region of the flange 84a is fixed to the second arm section 28. A bearing unit 86 is provided, adjacent to the flange 84a of the final gear 84, to rotatably support the second arm section 28 on the fourth joint section 26.

The fifth driving mechanism 72 includes a drive motor 88 accommodated in the fourth joint section 26, and a power transmission mechanism 90 for transmitting the output power of the drive motor 88 to the wrist section 32 (FIG. 1). The power transmission mechanism 90 includes a gear train 92 connected to an output shaft 88a of the drive motor 88; a hollow tubular drive shaft 94 accommodated in the second arm section 28 and connected to the gear train 92 at one end of the drive shaft 94; and a reduction gear unit (not shown) accommodated in the wrist joint section 30 (FIG. 1) and connected to the other end of the drive shaft 94. An output-side gear 96 of the gear train 92 has a hollow tubular body, a part of which is coaxially disposed, through a bearing 98, inside the final gear 84 of the gear train 82 in the power transmission mechanism 78 of the fourth driving mechanism 70. Further, the output-side gear 96 is coaxially secured to the drive shaft 94.

Similarly, the sixth driving mechanism 74 includes a drive motor (not shown) accommodated in the fourth joint section 26; and a power transmission mechanism 100 for transmitting the output power of the drive motor to the end member 32a of the wrist section 32 (FIG. 1). The power transmission mechanism 100 includes a gear train (only an output-side gear 102 is shown) connected to an output shaft of the drive motor; a hollow tubular drive shaft 104 accommodated in the second arm section 28 and connected to the gear train at one end of the drive shaft 104; and a reduction gear unit (not shown) accommodated in the wrist joint section 30 (FIG. 1) and connected to the other end of the drive shaft 104. The output gear 102 of the gear train has a hollow tubular body, a part of which is coaxially disposed, through a bearing 106, inside the output-side gear 96 of the gear train 92 in the power transmission mechanism 90 of the fifth driving mechanism 72. Further, the output-side gear 102 is coaxially secured to the drive shaft 104, and the drive shaft 104 is coaxially disposed inside the drive shaft 94 in the power transmission mechanism 90 of the fifth driving mechanism 72.

The robot 12 configured as described above is equipped, in the respective joint sections 16, 20, 24, 26 and 30, with sealing devices 10, each including overlapped seal portions having a multi-stage configuration provided for each driving mechanism incorporated into each joint section 16, 20, 24, 26, 30. As representative examples, the configurations of the sealing devices 10 provided in the first and fourth joint sections 16 and 26 will be described below with reference to FIGS. 4 and 5.

As shown in FIG. 4, the first joint section 16 includes a circumferential wall 110 defining an accommodation space 108 for accommodating, in particular, the power transmission mechanism 38 of the first driving mechanism 34. The circumferential wall 110 includes a first wall member 112 fixedly arranged (as a separate part, in the drawing) at the top end of the stationary base 14; and a second wall member 114 fixedly arranged (as a unitary part, in the drawing) at the bottom end of the rotary post 18. The first wall member 112 has a hollow frustum shape extending upward with the diameter thereof gradually decreasing (or tapering in an upward direction) and opening at its top end, and defines therein a cavity 108a (i.e., a part of the accommodation space 108) for accommodating the gear train 40 of the power transmission mechanism 38. On the other hand, the second wall member 114 has a hollow frustum shape extending downward with the diameter thereof gradually increasing (or tapering in an upward direction) and opening at its bottom end, and defines therein a cavity 108b (i.e., another part of the accommodation space 108) for accommodating the reduction gear unit 42 of the power transmission mechanism 38.

The reduction gear unit 42 is arranged such that the fixed member 42a is fixed to an opening edge 112a at the top end of the first wall member 112, and that the output member 42c is fixed to an upper end face 114a of the second wall member 114. In this configuration, the bearing unit 48 interposed between the fixed member 42a and the output member 42c of the reduction gear unit 42 (i.e., a pair of relatively movable members of the reduction gear unit 42) functions as to support, in a mutually rotatable manner about the first control axis J1 (FIG. 1), the stationary base 14 and the rotary post 18, which are joined through the first joint section 16 (i.e., a pair of relatively movable sections of the robot 12).

In the first joint section 16 configured as described above, a suitable lubricant is previously retained, mainly in the cavity 108a of the first wall member 112, in the interior of the reduction gear unit 42, and in each of the bearing units 44, 46 and 48. Therefore, in order to prevent the lubricant, or dust particles generated by the abrasion of components, from leaking out, to the exterior of the first joint section 16, and prevent foreign matter in an external environment of the robot 12 from penetrating into the interior of the first joint section 16, the first joint section 16 is equipped with the sealing device 10 that provides overlapped seal portions 116, 118 having a multi-stage configuration for the first driving mechanism 34.

As shown in FIG. 4, the sealing device 10 provided in the first joint section 16 includes a first seal portion 116 for sealing a first inter-member gap (i.e., a gap defined between the fixed member 42a and the output member 42c of the reduction gear unit 42, in the illustrated embodiment) 120 defined adjacent to lubricant retaining sections (i.e., the cavity 108a; the reduction gear unit 42; the bearing units 44, 46, 48) provided in the first driving mechanism 34. The first seal portion 116 includes a first contact seal element (e.g., an oil seal) 122 adapted to seal a gap between relatively moving surfaces through a lip contact structure. The first contact seal element 122 is disposed in the first inter-member gap 120 having the shape of an annular recess defined adjacent to and axially outside the bearing unit 48 arranged between the fixed member 42a and the output member 42c of the reduction gear unit 42 (i.e., a pair of relatively movable members). In this connection, the bearing unit 48 may be configured as a cross-roller bearing in which the fixed member 42a and the output member 42c of the reduction gear unit 42 act as an outer ring and an inner ring, respectively.

As described above, the bearing unit 48 supports, in a mutually rotatable manner, the pair of relatively movable sections (i.e., the stationary base 14 and the rotary post 18) of the robot 12, which are joined through the first joint section 16, and configured as an assembly of parts, movable relative to each other, arranged spatially closest to the external environment of the robot 12. Therefore, regardless of the operating state of the robot 12, the first contact seal element 122 arranged as described above acts to hermetically seal the lubricant retaining sections (i.e., the cavity 108a; the reduction gear unit 42; the bearing units 44, 46, 48) of the first driving mechanism 34, and thereby surely prevents the lubricant or dust particles from leaking out of the lubricant retaining sections to the exterior of the first driving mechanism 34, and also surely prevents foreign matter in the outside of the first driving mechanism 34 from penetrating into the lubricant retaining sections.

Further, the sealing device 10 provided in the first joint section 16 includes a second seal portion 118, arranged outside the first seal portion 116, for sealing a second inter-member gap (i.e., a gap defined between the first wall member 112 and the second wall member 114, in the illustrated embodiment) 124 defined in the circumferential wall 110 of the first joint section 16, which surrounds the first driving mechanism 34. The second seal portion 118 includes a second contact seal element (e.g., a V-ring) 126 adapted to seal a gap between surfaces, moving relative to each other, through a lip contact structure. The second contact seal element 126 is disposed in the second inter-member gap 124 defined between outer circumferential edge regions 112b, 114b of the top end of the first wall member 112 and the bottom end of the second wall member 114, respectively, in the circumferential wall 110, the edge regions 112b, 114b being adjacent and opposing each other.

The outer circumferential edge regions 112b, 114b of the respective first and second wall members 112, 114 function as a region allowing the accommodation space 108 of the first joint section 16 to be directly communicated with the external environment of the robot 12. Therefore, regardless of the operating state of the robot 12, the second contact seal element 126 arranged as described above acts to hermetically seal the accommodation space 108, and thereby surely prevents the lubricant or dust particles from leaking out of the accommodation space 108 to the exterior of the first joint section 16, and also surely prevents foreign matter in the exterior of the first joint section 16 from penetrating into the accommodation space 108. Moreover, the first wall member 112 and the second wall member 114 are a pair of members, movable relative to each other, joined respectively to the stationary element (i.e., the fixed member 42a of the reduction gear unit 42) and the movable element (i.e., the output member 42c of the reduction gear unit 42) of the bearing unit 48 as described above, and therefore the second contact seal element 126 exhibits an additional or fail-safe sealing function for the lubricant retaining sections (i.e., the cavity 108a; the reduction gear unit 42; the bearing units 44, 46, 48) of the first driving mechanism 34, which are sealed by the first contact seal element 122.

Thus, in the sealing device 10 configured as described above, both the first seal portion 116 and the second seal portion 118, constituting the overlapped seal portions having a multi-stage configuration, include the contact seal elements 122, 126, so that, even if the lubricant or dust particles pass through the first contact seal element 122 of the first seal portion 116, the second contact seal element 126 of the second seal portion 118 exhibits a high-level sealing function against such lubricant or dust particles, and surely prevents the lubricant or dust particles from leaking out of the accommodation space 108 to the exterior of the first joint section 16 (i.e., to the external environment of the robot 12). Furthermore, even if foreign matter, such as dust particles, liquid droplets, etc., exist in the external environment of the robot 12, the second contact seal element 126 of the second seal portion 118 exhibits a high-level sealing function against foreign matter, and reliably prevents the dust particles or liquid droplets existing in the external environment from penetrating into the accommodation space 108.

Consequently, according to the sealing device 10, it is possible to reliably prevent the lubricant or dust particles, retained or generated in the first driving mechanism 34 incorporated into the first joint section 16, from leaking out, to the exterior of the first joint section 16, and thereby prevent the contamination of the environment of the robot or an objective workpiece to be operated by the robot 12 due to the operation of the robot 12. Moreover, according to the sealing device 10, it is possible to reliably prevent foreign matter in the external environment of the robot 12 from penetrating into the interior of the first joint section 16, and thereby prevent a malfunction of the robot 12 due to the penetration of foreign matter. The robot 12 equipped with the sealing device 10 in the first joint section 16 can be suitably used on manufacturing lines in which products are required to be free from contamination, such as food, medicine, etc.

In should be noted that, in the illustrated embodiment, a single contact seal element (e.g., an oil seal) 128 is exclusively arranged between the pipe 68 provided in the first joint section 16 and the rotary post 18. The contact seal element 128 acts to prevent the lubricant retained in the first driving mechanism 34 from leaking out thereof. Even if the lubricant leaks out through the contact seal element 128, the lubricant then enters the internal space of the rotary post 18, and therefore it is not necessary to provide any overlapped seal portions having a multi-stage configuration for this region. Further, in the illustrated embodiment, the first joint section 16 is provided with the circumferential wall 110 defining the accommodation space 108 for accommodating the first driving mechanism 34, and the second contact seal element (e.g., the V-ring) 126, capable of sealing a gap between relatively moving surfaces through a lip contact structure, is disposed in the second inter-member gap 124 formed in the circumferential wall 110, so that it is possible to provide the first joint section 16 with a substantially flush outer surface with less unevenness. As a result, it is also possible to obtain advantages such that an external appearance of the robot 12 is improved and cleaning by using a washing agent is facilitated.

Each of the second and third joint sections 20, 24 of the robot 12 may be equipped with a sealing device 10 having a configuration substantially similar to the above-described sealing device 10 for the first joint section 16. FIG. 2 shows a first contact seal element 130 and a second contact seal element 132, of the sealing device 10 provided in the second joint section 20. Descriptions of the sealing devices 10 in the respective joint sections 20, 24 are not repeated.

Referring to FIG. 5, the fourth joint section 26 includes a circumferential wall 136 defining an accommodation space 134 for accommodating, particularly, the power transmission mechanism 78 of the fourth driving mechanism 70. The circumferential wall 136 includes a first wall member 138 rotatably connected to the third joint section 24 (FIG. 1); and a second wall member 140 fixedly arranged (as a unitary part, in the drawing) at the proximal end of the second arm section 28. The first wall member 138 has a hollow tubular shape opening at its one end, and the second wall member 140 has an annular flange shape protruding outwardly at the proximal end of the second arm section 28. The first wall member 138 and the second wall member 140 cooperate with each other to define the accommodation space 134 for accommodating the reduction gear unit 80 and the gear train 82 of the power transmission mechanism 78. It should be noted that the gear train 92 of the power transmission mechanism 90 of the fifth driving mechanism 72 as well as the gear train (or the output-side gear 102) of the power transmission mechanism 100 of the sixth driving mechanism 74 are also accommodated in the accommodation space 134.

The power transmission mechanism 78 of the fourth driving mechanism 70 is arranged such that the reduction gear unit 80 is fixed to the first wall member 138 through a bracket 142, and that the final gear 84 of the gear train 82 is fixed to the second wall member 140 (i.e., the proximal end of the second arm section 28). In this configuration, the bearing unit 86 interposed between the first wall member 138 and the second wall member 140 functions as to support, in a mutually rotatable manner about the fourth control axis J4 (FIG. 1), the first arm section 22 (FIG. 1) and the second arm section 28, which are joined through the fourth joint section 26 and the third joint section 24 (i.e., a pair of relatively movable sections of the robot 12).

In the fourth joint section 26 configured as described above, a suitable lubricant is previously retained, mainly in the accommodation space 134, in the interior of the reduction gear unit 80, and in the bearing units 86, 98 and 106. Therefore, in order to prevent the lubricant, or dust particles generated by the abrasion of components, from leaking out, to the exterior of the fourth joint section 26, and also prevent foreign matter existing in an external environment of the robot 12 from penetrating into the interior of the fourth joint section 26, the fourth joint section 26 is equipped with the sealing device 10 that provides overlapped seal portions 144, 146 having a multi-stage configuration for the fourth driving mechanism 70.

As shown in FIG. 5, the sealing device 10 provided in the fourth joint section 26 includes a first seal portion 144 for sealing a first inter-member gap (i.e., a gap defined between the bearing unit 86 secured to the first wall member 138 and the second wall member 140, in the illustrated embodiment) 148 defined adjacent to lubricant retaining sections (i.e., the accommodation space 134; the reduction gear unit 80; the bearing units 86, 98, 106) provided in the fourth driving mechanism 70 (as well as the fifth and sixth driving mechanisms 72, 74). The first seal portion 144 includes a first contact seal element (e.g., an oil seal) 150 adapted to seal a gap between relatively moving surfaces through a lip contact structure. The first contact seal element 150 is disposed in the first inter-member gap 148 having the shape of an annular recess defined axially outside the outer ring 86a of the bearing unit 86 (at a side opposite to the accommodation space 134).

As described above, the bearing unit (e.g., a cross roller bearing) 86 supports, in a mutually rotatable manner, the pair of relatively movable sections (i.e., the first arm section 22 and the second arm section 28) of the robot 12, which are joined through the fourth joint section 26, and is configured as an assembly of relatively movable parts arranged spatially closest to the external environment of the robot 12. Therefore, regardless of the operating state of the robot 12, the first contact seal element 150 arranged as described above acts to hermetically seal the lubricant retaining sections (i.e., the accommodation space 134; the reduction gear unit 80; the bearing units 86, 98, 106) of the fourth driving mechanism 70 as well as the fifth and sixth driving mechanisms 72, 74, and thereby reliably prevents the lubricant or dust particles from leaking out of the lubricant retaining sections to the exterior of the fourth driving mechanism 70, and also prevents foreign matter existing in the exterior of the fourth driving mechanism 70 from penetrating into the lubricant retaining sections.

Further, the sealing device 10 provided in the fourth joint section 26 includes a second seal portion 146, arranged outside the first seal portion 144, for sealing a second inter-member gap (i.e., a gap defined between the first wall member 138 and the second wall member 140, in the illustrated embodiment) 152 defined in the circumferential wall 136 of the fourth joint section 26, which surrounds the fourth driving mechanism 70. The second seal portion 146 includes a second contact seal element (e.g., a V-ring) 154 adapted to seal a gap between relatively moving surfaces through a lip contact structure. The second contact seal element 154 is disposed in the second inter-member gap 152 defined between outer circumferential edge regions 138a, 140a of one end of the first wall member 138 and one end of the second wall member 140, respectively, in the circumferential wall 136, the edge regions 138a, 140a being adjacent and opposing to each other.

The outer circumferential edge regions 138a, 140a of the respective first and second wall members 138, 140 function as a region allowing the accommodation space 134 of the fourth joint section 26 to be directly communicated with the external environment of the robot 12. Therefore, regardless of the operating state of the robot 12, the second contact seal element 154 arranged as described above acts to hermetically seal the accommodation space 134 and thereby reliably prevents the lubricant or dust particles from leaking out of the accommodation space 134 to the exterior of the fourth joint section 26, and also reliably prevents the foreign matter existing in the exterior of the fourth joint section 26 from penetrating into the accommodation space 134. Moreover, the first wall member 138 and the second wall member 140 are a pair of relatively movable members joined respectively to the stationary element (i.e., the outer ring 86a) and the movable element (i.e., the inner ring 86b) of the bearing unit 86 as described above, and therefore the second contact seal element 154 exhibits an additional or fail-safe sealing function for the lubricant retaining sections (i.e., the accommodation space 134; the reduction gear unit 80; the bearing units 86, 98, 106) of the fourth driving mechanism 70 as well as the fifth and sixth driving mechanisms 72, 74, which are sealed by the first contact seal element 150.

Thus, similar to the sealing device 10 provided for the first joint section 16 described above, also in the sealing device 10 provided for the fourth joint section 26, both of the first seal portion 144 and the second seal portion 146, constituting the overlapped seal portions having a multi-stage configuration, include the contact seal elements 150, 154, so that, even if the lubricant or dust particles passes through the first contact seal element 150 of the first seal portion 144, the second contact seal element 154 of the second seal portion 146 exhibits a high-level sealing function against such lubricant or dust particles, and reliably prevents the lubricant or dust particles from leaking out of the accommodation space 134 to the exterior of the fourth joint section 26 (i.e., to the external environment of the robot 12). Furthermore, even if dust particles, liquid droplets, etc., exist in the external environment of the robot 12, the second contact seal element 154 of the second seal portion 146 exhibits a high-level sealing function against such dust particles or liquid droplets, and reliably prevents dust particles or liquid droplets existing in the external environment from penetrating into the accommodation space 134.

Consequently, according to the sealing device 10, it is possible to reliably prevent the lubricant or dust particles, retained or generated in the fourth driving mechanism 70 as well as the fifth and sixth driving mechanisms 72, 74 incorporated into the fourth joint section 26, from leaking out, to the exterior of the fourth joint section 26, and thereby prevent the contamination of the environment of the robot 12 or an objective workpiece to be operated by the robot 12 due to the operation of the robot 12. Moreover, according to the sealing device 10, it is possible to reliably prevent foreign matter existing in the external environment of the robot 12 from penetrating into the interior of the fourth joint section 26, and thereby prevent malfunctions of the robot 12 due to the penetration of the foreign matter. The robot 12 equipped with the sealing device 10 in the fourth joint section 26 can be suitably used on manufacturing lines in which products are required to be free from contamination, such as food, medicine, etc.

It should be noted that, in the illustrated embodiment, a single contact seal element (e.g., an oil seal) 156, 158 is exclusively arranged for each of the bearing units 98, 106 provided in the fifth and sixth driving mechanisms 72, 74. Each contact seal element 156, 158 acts to prevent the lubricant retained in each bearing units 98, 106 from leaking out thereof. Even if the lubricant leaks out through the respective contact seal elements 156, 158, the lubricant then enters the internal space of the second arm section 28, and therefore it is not necessary to provide any overlapped seal portions having a multi-stage configuration for these regions. Further, in the illustrated embodiment, the fourth joint section 26 is provided with the circumferential wall 136 defining the accommodation space 134 for accommodating the fourth driving mechanism 70, and the second contact seal element (e.g., the V-ring) 154, capable of sealing a gap between relatively moving surfaces through a lip contact structure, is disposed in the second inter-member gap 152 formed in the circumferential wall 136, so that it is possible to provide the first joint section 16 with a substantially flush outer surface with less unevenness. As a result, it is also possible to obtain advantages such that an external appearance of the robot 12 is improved and cleaning by using a washing agent is facilitated.

It should be noted that the wrist joint section 30 (FIG. 1) of the robot 12 may be equipped with a sealing device 10 having a configuration substantially similar to the above described sealing device 10 of each of the first and fourth joint sections 16, 26.

As understood from the above description, according to the inventive sealing device, both of the first seal portion and the second seal portion, constituting the overlapped seal portions having a multi-stage configuration, include the contact seal elements, so that, even if the lubricant or dust particles passes through the first contact seal element of the first seal portion, the second contact seal element of the second seal portion exhibits a high-level sealing function against such lubricant or dust particles, and reliably prevents the lubricant or dust particles from leaking out of the accommodation space to the exterior of the joint section. Furthermore, even if dust particles, liquid droplets, etc., exist in the external environment of the joint section, the second contact seal element of the second seal portion exhibits a high-level sealing function against such dust particles or liquid droplets, and reliably prevents the dust particles or liquid droplets existing in the external environment from penetrating into the accommodation space. Consequently, it is possible to reliably prevent the lubricant or dust particles, retained or generated in the driving mechanism incorporated into the joint section, from leaking out, to the exterior of the joint section, and thereby prevent the contamination of the environment or an objective workpiece to be operated, due to the operation of the robot. Moreover, it is possible to reliably prevent foreign matter existing in the external environment from penetrating into the interior of the joint section, and thereby prevent malfunctions of the robot due to the penetration of the foreign matter.

Also, according to the inventive sealing device, regardless of the operating state of a pair of relatively movable sections of the robot, the lubricant retaining section of the bearing unit supporting the sections, movable relative to each other, in a manner rotatable with respect to each other can be reliably and hermetically sealed by the first contact seal element.

Also, according to the inventive sealing device, the lubricant retaining section provided in the reduction gear unit of the driving mechanism can be reliably and hermetically sealed by the first contact seal element.

Also, according to the inventive sealing device, regardless of the operating state of a pair of sections, movable relative to each other, of the robot, the accommodation space can be reliably and hermetically sealed by the second contact seal element disposed between the pair of wall members provided respectively in the relatively movable sections.

Also, according to the inventive sealing device, the accommodation space provided in the joint section can be reliably and hermetically sealed by the second contact seal element.

Also, the inventive articulated robot can be suitably used on manufacturing lines in which products are required to be free from contamination, such as food, medicine, etc.

While the invention has been described with reference to specific preferred embodiments, it will be understood, by those skilled in the art, that various changes and modifications may be made thereto without departing from the scope of the following claims.

The invention claimed is:

1. An articulated robot comprising:
   a joint section;
   a driving mechanism incorporated into said joint section;
   a bearing unit provided in said driving mechanism and supporting, in a mutually rotatable manner, a pair of sections joined through said joint section movably relative to each other; and
   a sealing device provided in said joint section and comprising overlapped seal portions having a multi-stage configuration provided for said driving mechanism;
   wherein said bearing unit comprises a cross-roller bearing;
   wherein said sealing device comprises:
      a first seal portion including a first contact seal element sealing a first inter-member gap defined adjacent to a lubricant retaining section provided in said driving mechanism; and
      a second seal portion arranged outside said first seal portion and including a second contact seal element sealing a second inter-member gap defined in a circumferential wall of said joint section, said circumferential wall defining an accommodation space for accommodating said driving mechanism;
   wherein said first inter-member gap is defined adjacent to said bearing unit;
   wherein said first contact seal element is disposed in said first inter-member gap;
   wherein said circumferential wall of said joint section includes two wall members rotatable relative to each other;
   wherein said second inter-member gap is defined between outer circumferential edge regions of end faces of said two wall members, said end faces being adjacent and opposing each other in a direction along a rotation axis of said two wall members; and
   wherein said second contact seal element is disposed in said second inter-member gap and seals said second inter-member gap through a lip contact structure contacting one of said end faces of said two wall members.

2. The articulated robot of claim 1, wherein said driving mechanism includes a reduction gear unit; and wherein said bearing unit and said first contact seal element are disposed between a pair of members, movable relative to each other, of said reduction gear unit.

3. The articulated robot of claim 1, wherein said two wall members of said circumferential wall of said joint section are joined respectively to a stationary element and a movable element of said bearing unit.

* * * * *